US012057142B2

(12) United States Patent
Liu et al.

(10) Patent No.: US 12,057,142 B2
(45) Date of Patent: Aug. 6, 2024

(54) GENERATION OF VISUAL EFFECTS BASED ON TEXT

(71) Applicant: Lemon Inc., Grand Cayman (KY)

(72) Inventors: Bingchen Liu, Los Angeles, CA (US); Kin Chung Wong, Los Angeles, CA (US); Blake Garrett Fuselier, Los Angeles, CA (US); Lingyiqing Zhou, Los Angeles, CA (US); Diana Lee, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/898,669

(22) Filed: Aug. 30, 2022

(65) Prior Publication Data

US 2023/0326489 A1 Oct. 12, 2023

Related U.S. Application Data

(63) Continuation of application No. 17/715,645, filed on Apr. 7, 2022.

(51) Int. Cl.
G11B 27/031 (2006.01)
G06T 11/00 (2006.01)
G06T 11/60 (2006.01)

(52) U.S. Cl.
CPC .......... *G11B 27/031* (2013.01); *G06T 11/001* (2013.01); *G06T 11/60* (2013.01); *G06T 2200/24* (2013.01)

(58) Field of Classification Search
CPC ...... G11B 27/031; G06T 11/001; G06T 11/60
See application file for complete search history.

(56) References Cited

U.S. PATENT DOCUMENTS

| 2003/0011750 | A1* | 1/2003 | Tzidon ..................... H04N 5/74 |
| | | | 353/30 |
| 2006/0041632 | A1* | 2/2006 | Shah ..................... G06F 16/435 |
| | | | 709/217 |
| 2015/0248429 | A1* | 9/2015 | Pregueiro ........... G06F 16/9577 |
| | | | 715/202 |
| 2020/0167995 | A1 | 5/2020 | Hare et al. |
| 2020/0327733 | A1 | 10/2020 | Mueller et al. |
| 2020/0372370 | A1* | 11/2020 | Donahue ................. G06N 3/084 |
| 2021/0200800 | A1* | 7/2021 | Shin ......................... G06F 16/51 |
| 2021/0227195 | A1 | 7/2021 | Holzer et al. |

FOREIGN PATENT DOCUMENTS

| CN | 112750203 A | 5/2021 |
| CN | 113362455 A | 9/2021 |
| WO | WO 2021/112631 A1 | 6/2021 |

OTHER PUBLICATIONS

International Patent Application No. PCT/SG2023/050205; Int'l Search Report; dated Oct. 3, 2023; 5 pages.
Li et al.; "Video Generation From Text"; AAAI Conf. on Artificial Intelligence; Oct. 2017; 4 pages (Abstract Only).

* cited by examiner

*Primary Examiner* — Mishawn N. Hunter
(74) *Attorney, Agent, or Firm* — BakerHostetler

(57) ABSTRACT

The present disclosure describes techniques for generating visual effects based on text. The techniques comprise initiating a process of generating a visual effect in response to a selection of an interface element; generating the visual effect, wherein the generating the visual effect comprises generating a first image based on a first text input by a first user, and wherein content of the first image correlates with the first text; and causing to display the first image on a screen of a computing device.

17 Claims, 12 Drawing Sheets

GENERATION OF VISUAL EFFECTS BASED ON TEXT

CROSS REFERENCE TO RELATED APPLICATION

The present application is a continuation of U.S. patent application Ser. No. 17/715,645, filed on Apr. 7, 2022, the disclosure of which is incorporated herein by reference in its entirety.

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

A user may want to generate content using one or more images. For example, a user may want to generate a video using one or more images as the background (i.e., backdrop). However, it may be time-consuming and/or difficult for users to find and/or generate suitable images for such a purpose. For example, a user may have to spend several minutes, or even hours, searching for a suitable image. If the user is not able to find an existing suitable image, the user may have to spend additional time creating a suitable image from scratch. Some existing text-to-image applications allow users to input text prompts and receive back a generated image related to the input text prompt. However, such existing applications lack user interaction. As a result, such existing applications do not facilitate creativity amongst their users, and users may quickly get bored with the existing applications. Thus, improved techniques for content creation using text-to-image generation are desirable.

Described herein are improved techniques for content creation using text-to-image generation. Such techniques may be utilized to generate an image from text, with the image being blended with other content (i.e., a live camera feed, on-screen text graphics, etc.) to create a video. The improved techniques for content creation using text-to-image generation described herein utilize the text-to-image generation capability in connection with a greater variety of user-case scenarios. For example, the improved techniques for content creation using text-to-image generation described herein respond to not only one text prompt, but also to a series of sentences to generate multiple images that form a storytelling video. Thus, the improved techniques for content creation using text-to-image generation described herein utilize the text-to-image generation capability to provide a more interactive user experience.

Figure 1:
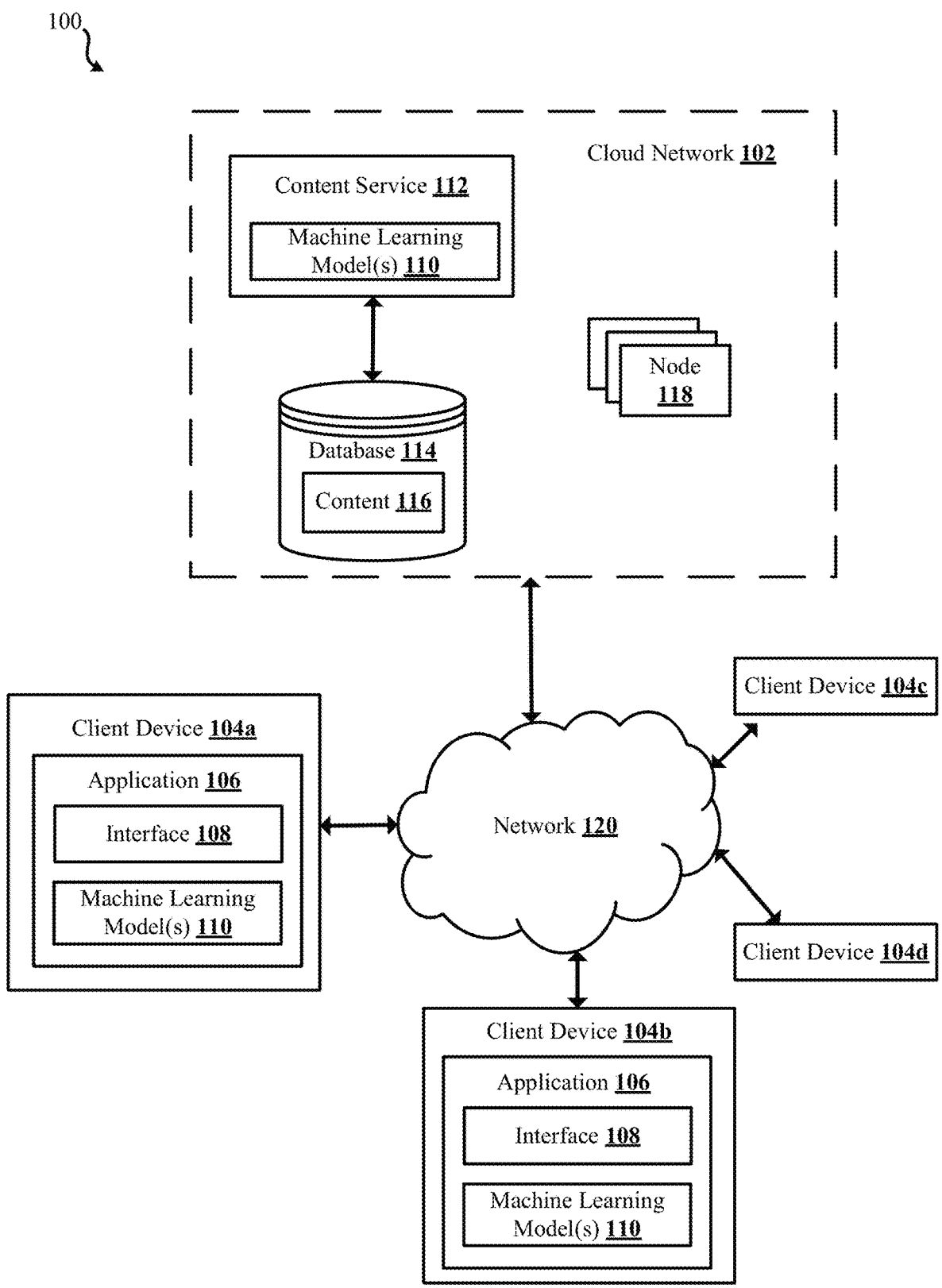
FIG. 1 shows an example system for distributing content.

The improved techniques for content creation using text-to-image generation described herein may be utilized by a system, such as the system 100 shown in FIG. 1. FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a content service 112. The content service 112 may comprise a content streaming service, such as an Internet protocol video streaming service.

The content service 112 may be configured to distribute content 116 via a variety of transmission techniques. The content service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the content service 112 may comprise a video sharing service, a video hosting platform, a content distribution platform, a collaborative gaming platform, and/or the like.

In an embodiment, the content 116 distributed or provided by the content service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, performing practical jokes, or giving advice, such as beauty and fashion advice, cooking tips, or home renovation tips.

In an embodiment, the content 116 may be output to different client devices 104 via the network 120. The content 116 may be streamed to the client devices 104. The content stream may be a stream of short videos received from the content service 112. The plurality of client devices 104 may be configured to access the content 116 from the content service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The content service 112 may be configured to receive input from users. The users may be registered as users of the content service 112 and may be users of the content application 106 operating on client devices 104. The user inputs may include short videos created by users, user comments associated with short videos, or "likes" associated with short videos. The user inputs may include connection requests and user input data, such as text data, digital image data, or user content. The connection requests may comprise requests from the client devices 104*a-d* to connect to the content service 112. The user input data may include information, such as short videos and/or user comments, that the users connected to the content service 112 want to share with other connected users of the content service 112.

The content service 112 may be able to receive different types of input from users using different types of client devices 104. For example, a user using the content application 106 on a first user device, such as a mobile phone or tablet, may be able to create and upload short videos using the content application 106. A user using the content application 106 on a different mobile phone or tablet may also be able to view, comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104 to create a short video and upload the short video to the cloud network 102. The client devices 104 may access an interface 108 of the content application 106. The interface 108 may comprise an input element. For example, the input element may be configured to allow users to create the short video. To create the short video, the user may give the content application 106 permission to access an image capture device, such as a camera, or a microphone of the client device 104. Using the content application 106, the user may select a duration for the short video or set a speed for the short video, such as "slow-motion" or "speed things up."

The user may edit the short video using the content application 106. The user may add one or more texts, filters, sounds, or effects, such as beauty effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the cloud network 102 and/or to save the short video locally to the user device 104. When a user uploads the short video to the cloud network 102, they may choose whether they want the short video to be viewable by all other users of the content application 106 or viewable by only a subset of the users of the content application 106. The content service 112 may store the uploaded short videos and any metadata associated with the short videos in one or more databases 114.

In an embodiment, a user may use the content application 106 on a client device 104 to provide input on a short video. The client devices 104 may access an interface 108 of the content application 106 that allows users to provide input associated with short videos. The interface 106 may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The content service 112 may store the input and associated metadata in a database 114.

The content service 112 may be configured to output the uploaded short videos and user input to other users. The users may be registered as users of the content service 112 to view short videos created by other users. The users may be users of the content application 106 operating on client devices 104. The content application 106 may output (display, render, present) the short videos and user comments to a user associated with a client device 104. The client devices 104 may access an interface 108 of the content application 106. The interface 108 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The content service 112 may output the short video and the associated comments simultaneously. Comments may be output by the content service 112 in real-time or near-real-time. The content application 106 may display the short videos and comments in various ways on the client device 104. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 118 may process tasks associated with the content service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

As discussed above, a user may use the content application 106 on a client device 104 to create a short video and upload the short video to the cloud network 102. In an embodiment, the short video created by the user via the content application 106 on the client device 104 may be a short video featuring the user moving a body part to the rhythm or beat of a pre-recorded audio overlay, such as the pre-recorded audio overlays described above. For example, the short video created by the user may be a short video featuring the user moving his or her own body part, such as the user's head and/or eyes, in a manner that corresponds to the rhythm or beat of a song or a song clip. As another example, the short video created by the user via the content application 106 on the client device 104 may be a short video featuring the user moving a different user's body part, such as the different user's head and/or eyes, in a manner that corresponds to the rhythm or beat of a song or a song clip. In other examples, a short video comprises an object that includes at least one part with movements in a plurality of images of the short video.

The client devices 104 may access an interface 108 of the content application 106. The interface 108 may comprise an input element. By way of example and without limitation, the input element may be configured to allow users to create the short video featuring an object moving one of its parts (e.g., the user or another user moving a body part) to the rhythm or beat of a pre-recorded audio overlay. For instance, to create the short video featuring the user moving a body part to the rhythm or beat of a pre-recorded audio overlay, the user may give the content application 106 permission to access an image capture device, such as a camera, or a microphone of the client device 104.

The client device 104 may utilize a feed captured by the image capture device to detect (e.g. locate) one or more parts of an object, such as one or more body parts of the user. For example, the client device 104 may utilize the feed captured by the image capture device to detect a head or face of the user. The one or more body parts detected by the camera may include those body parts that the user will move to the rhythm or beat of a pre-recorded audio overlay during the creation of the short video. For example, the client device 104 may utilize the feed captured by image capture device to detect a head or face of the user if the user will move his or her head/face to the rhythm or beat of a pre-recorded audio overlay during the creation of the short video.

In an embodiment, at least one of the content service 112 or the client devices 104 comprise one or more machine learning model(s) 110. The machine learning model(s) 110 may be utilized to generate at least one image based at least in part on text. The text may be associated with a video to be created by at least one user of the content service 112. For example, if at least one user of the content service 112 wants to create a video with a floral background, the text may include the word "flowers," "floral" "garden," etc. The text may be received by the content service 112 and/or by the client devices 104. The text, for example, may be input by the at least one user of the content service 112 that wants to create a video. For example, the text may be input by at least one user into an interface 108 of the content application 106. The text may be input such as by using a keyboard of a client device 104 or via voice command. Additionally, or alternatively, the text may comprise one or more song lyrics. The song lyrics may be manually input by at least one user (such as into an interface 108 of the content application 106) and/or the song may be a song that is pre-stored in a sound library of the content application 106. If the song is a song that is already stored in a sound library of the content application 106, the lyrics (i.e., text) associated with the song may already be known.

In certain embodiments, the machine learning model(s) 110 may be utilized to generate the at least one image based on both the text and based on a style selection. The style selection may indicate at least one of a color, a texture, or an artistic style associated with the video to be created by at least one user of the content service 112. For example, if at least one user of the content service 112 wants to create a video with a black and white background, the style selection may indicate a black and white color scheme. The style selection may be received by the content service 112 and/or by the client devices 104. The style selection for example, may be input by the at least one user of the content service 112 that wants to create a video. For example, the style selection may be input by the at least one user into an interface 108 of the content application 106. The style selection may be input such as by selecting an icon corresponding to the desired style on an interface 108 of the content application 106, using a keyboard of a client device 104, and/or via voice command.

Figure 2:
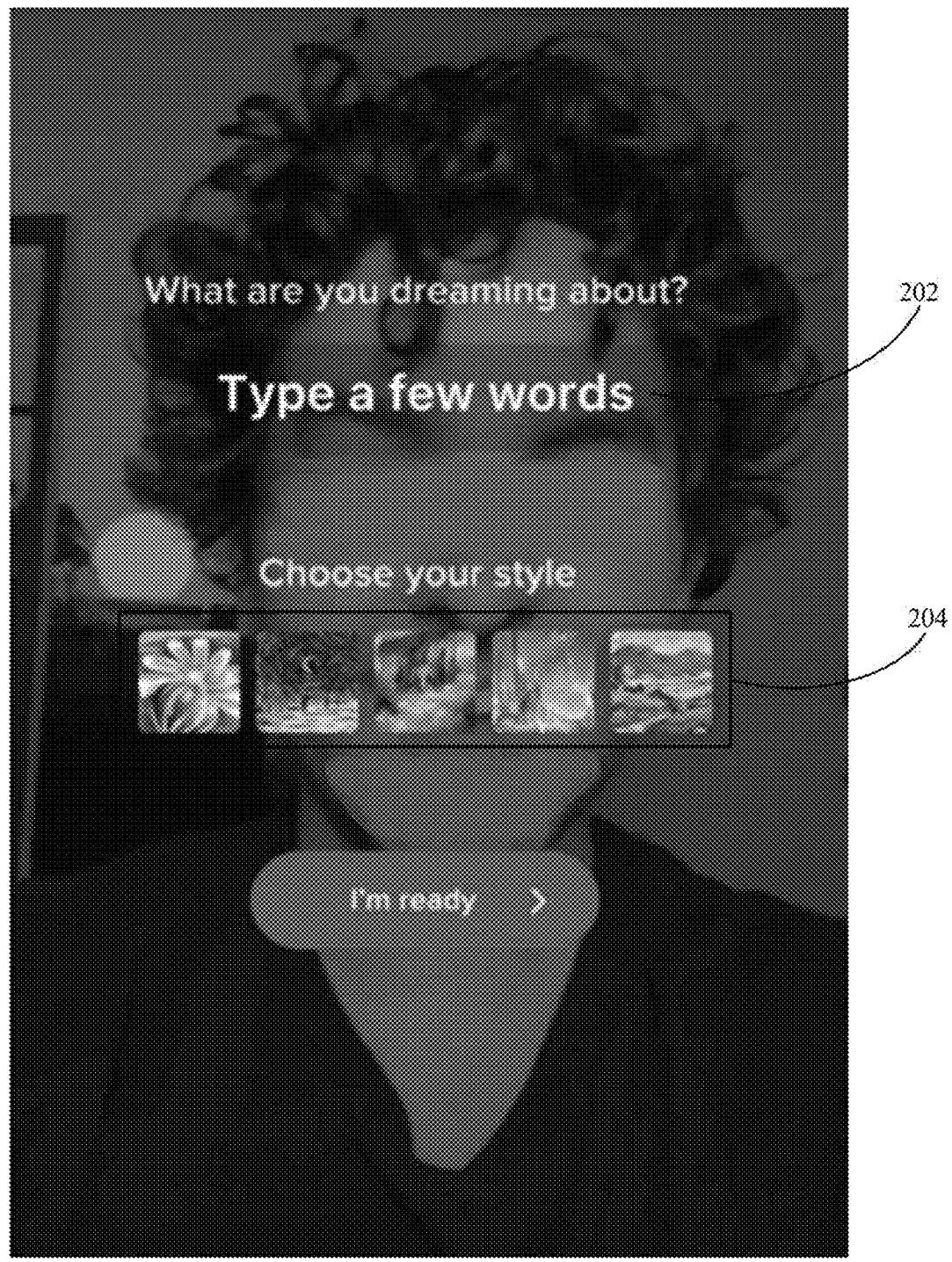
FIG. 2 shows an example user interface of a content distribution application in accordance with the present disclosure.

FIG. 2 illustrates an example user interface (UI) 200 of the content application 106. The UI 200 may be utilized by at least one user of the content service 112 that wants to create a video. The at least one user may enter text into the text box 202. The text, as described above, may be associated with a video to be created by the at least one user of the content service 112. The text may comprise any quantity of letters and/or words. For example, the text may comprise a single word, a phrase, a sentence, one or more song lyrics, and/or any other text. It should be appreciated that, in some embodiments, the text may not be manually entered by the at least one user. For example, if the text includes song lyrics, the user may select a song that is pre-stored in a sound library of the content application 106, and the lyrics (i.e., text) associated with the song may already be known.

In embodiments, the at least one user may also select a style associated with the video to be created by the at least one user. To select a style, the at least one user may select one or more icons located in a style box 204 that correspond to a desired style for the video. For example, each of the five icons located in the style box 204 may correspond to a particular style, such as a particular color, a texture, or an artistic style. The at least one user may select one or more icons that correspond to a desired style for the video, such as by clicking on the one or more desired icons with his or her finger.

Figure 3:
FIG. 3 shows another example user interface of a content distribution application in accordance with the present disclosure.

For example, as illustrated by the UI 300 of FIG. 3, the at least one user has entered the text "Cityscape" into the text box 202 and has selected the fifth icon in the style box 204. The text entered by the at least one user and the style selected by the at least one user indicate that the at least one user wants to create a video with a cityscape background in a particular style. After the at least one user has entered the text and/or the style selection, the user may select a button 302 to initiate generation of the one or more images.

In certain embodiments, the machine learning model(s) 110 comprises a first machine learning model. The first machine learning model may be configured to receive the text and/or style selection. For example, if the user selects the button 302 to initiate generation of the one or more images, the text and/or style selection may be forwarded or sent to the first machine learning model. If the at least one user selected a style associated with the video, the style may be converted to additional text before being sent to the first machine learning model. For example, the selected style may be converted to additional text, and this additional text may be appended to the text entered into the text box 202. The complete set of text (i.e., the text entered into the text box 202 and the additional text, if there is any) may be forwarded or sent to the first machine learning model.

The first machine learning model may be configured to generate at least one initial image based at least in part on the complete set of text. Each word in the complete set of text may be mapped to a number or word token. Each number or word token may then be converted into a word vector learned by the first machine learning model. Each word vector may have 512 dimensions. For example, if the complete set of text is "an apple on the car," then five word tokens will be generated (because there are five words), and then each word token may be converted into a 512 dimension word vector, resulting in a 5×512 matrix (composed of five 512 dimension word vectors). This 5×512 matrix may be used as the input of the first machine learning model. The first machine learning model may generate at least one initial image based on this input. For example, the first machine learning model may output at least one 256×256 image. The content of at least one initial image may match the meaning of the complete set of text.

In certain embodiments, the machine learning model(s) 110 comprises a second machine learning model. The second machine learning model may be configured to generate training data to train the first machine learning model. The second machine learning model may be configured to receive a plurality of images and generate a plurality of text captions corresponding to the plurality of images. For example, the second machine learning model may be configured to receive an image of a white dog and generate a text caption corresponding to that image that indicates the image depicts a white dog. The second machine learning model may generate such text captions for hundreds, thousands, or millions of images.

The first machine learning model may be trained on a dataset comprising the plurality of images and the plurality of corresponding text captions. In this manner, it can be ensured that the first machine learning model is trained on accurate image-text pairs. By contrast, if the first machine learning model were to instead be trained on available open-source datasets, the first machine learning model may not perform as well due to the inaccuracies often found in these available open-source datasets.

In certain embodiments, the machine learning model(s) 110 comprises a third machine learning model. The third machine learning model may be configured to improve the resolution of the initial image(s) output by the first machine learning model. The third machine learning model may be a super-resolution model. For example, the third machine learning model may receive both the complete text and the at least one initial image. The third machine learning model may be configured to generate, based on the complete text and the at least one initial image, at least one final image. The at least one final image has a higher resolution than the at least one initial image. For example, the at least one final image may be a 1024×1024 image (as opposed to the at least one 256×256 initial image). The at least one final image may be output to the at least one user, such as via an interface 108 of the content application 106.

In certain embodiments, the process of generating the at least one final image using the machine learning model(s) 110 may take some time. For example, it may take the machine learning model(s) 110 thirty seconds or more to generate the final image(s). This may result in a poor user experience if the user is not able to see anything on his or her interface 108 for thirty seconds or more. To remedy this, the machine learning model(s) 110 may gradually generate intermediate effects (such as images) in the process of generating the final image(s). For example, the machine learning model(s) 110 may generate a fraction (such as ⅛) of the final image(s) on the interface 108 first, and then gradually continue to display another ⅛ of the final image (from top to bottom, or vice versa) until the entire final image is displayed on the screen. For example, every few seconds (i.e., every two, three, four, five, etc. seconds) another fraction of the final image may be displayed on the screen. This reduces the user's waiting time and improves the user experience.

Figure 4B:
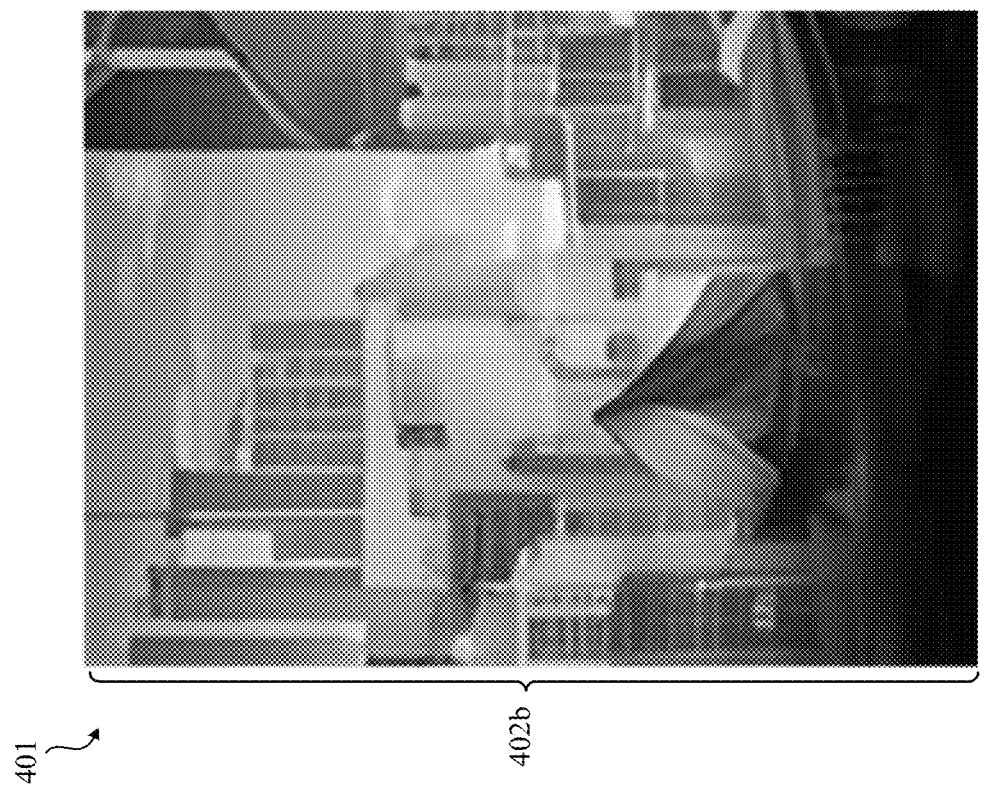
FIG. 4b shows another example user interface of a content distribution application in accordance with the present disclosure.
Figure 4A:
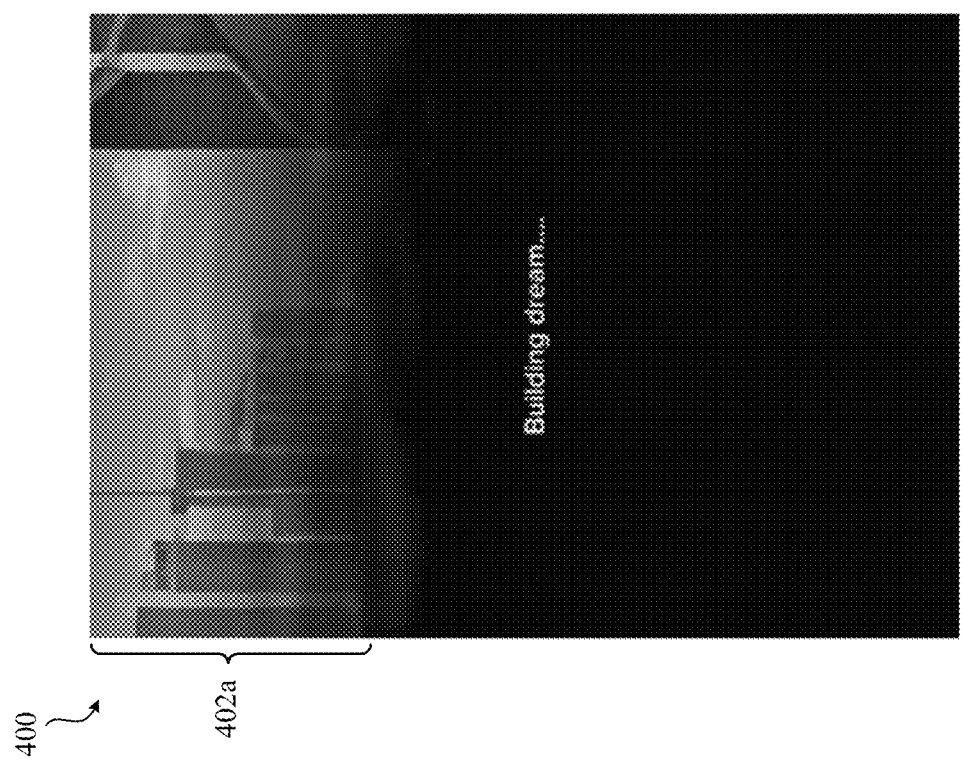
FIG. 4a shows another example user interface of a content distribution application in accordance with the present disclosure.

FIG. 4A and FIG. 4B illustrates example UIs 400 and 401 of the content application 106. The UIs 400 and 401 show the intermediate effects generated by the machine learning model(s) 110 to reduce user waiting time and improve the user experience. As shown in the UI 400, only a fraction 402a of the final image is displayed. As time progresses, additional fractions of the final image will gradually be displayed. For example, additional fractions of the final image will gradually be displayed until the until the entire final image 402b is displayed on the screen, as shown by the UI 401.

Figure 5:
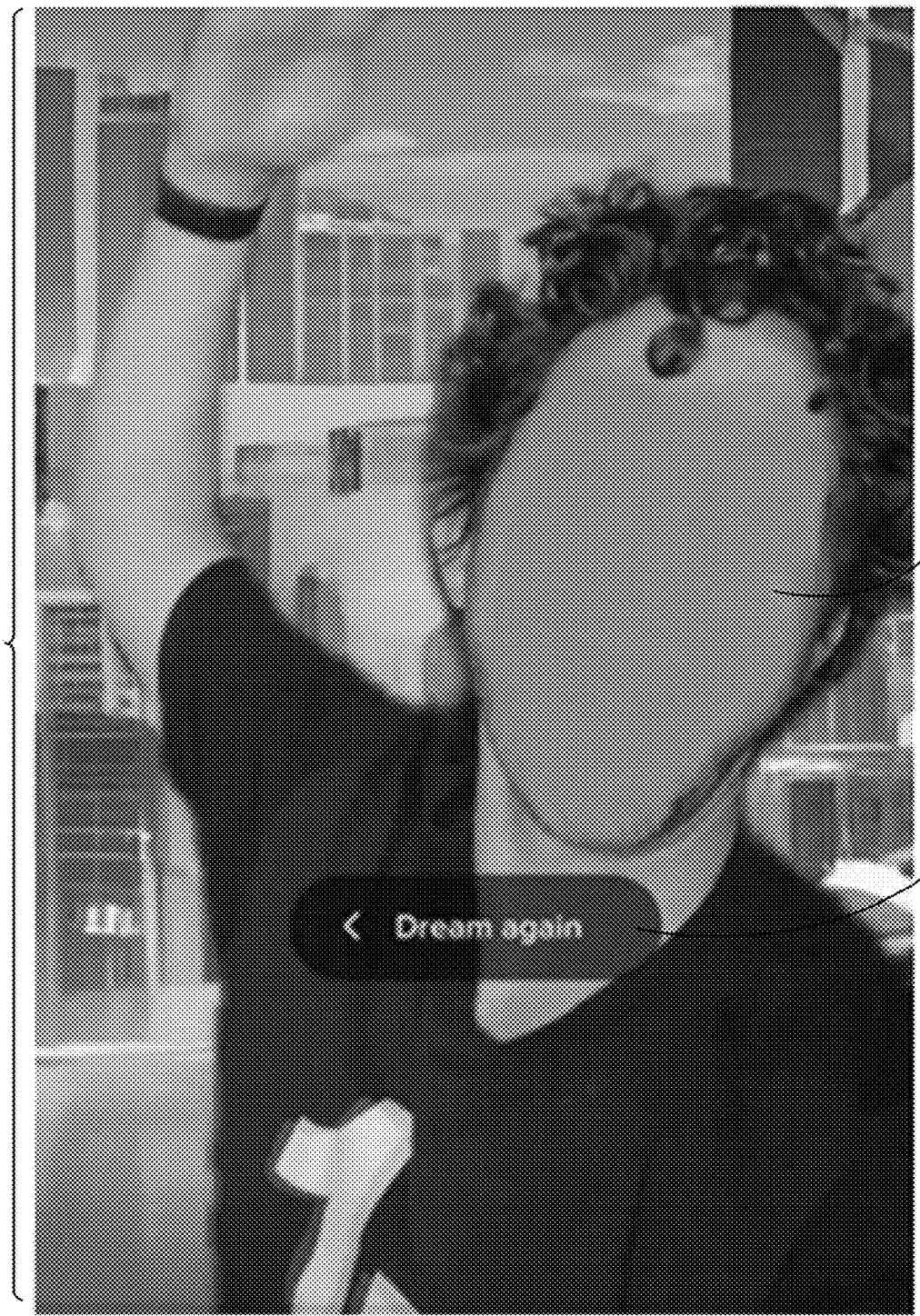
FIG. 5 shows another example user interface of a content distribution application in accordance with the present disclosure.

In certain embodiments, when the final image(s) is completely generated on the interface 108, the content application 106 may be configured to generate at least one part of a real-time camera feed on top of (i.e., overlayed on, interposed on) the final image(s). For example, as shown by the UI 500 depicted in FIG. 5, if the user is using a front camera of his or her client device 104, the user's real-time selfie 502 may appear over the final generated image(s) 402b so that the final image(s) act as a background in the user's video. The user can record him or herself with the final image(s) in the background.

Figure 6B:
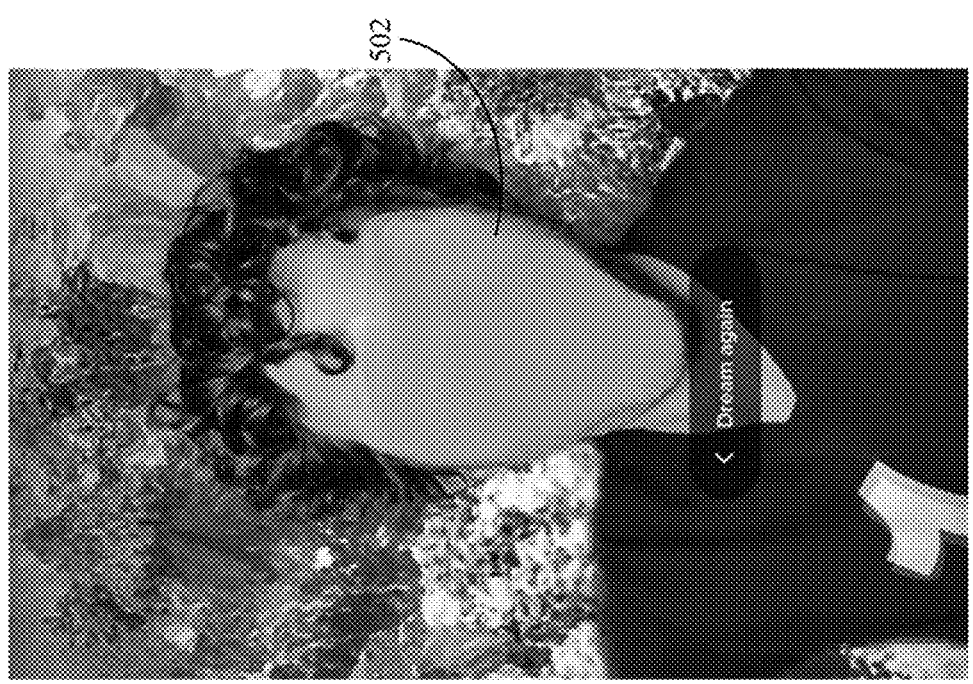
FIG. 6b shows another example user interface of a content distribution application in accordance with the present disclosure.
Figure 6A:
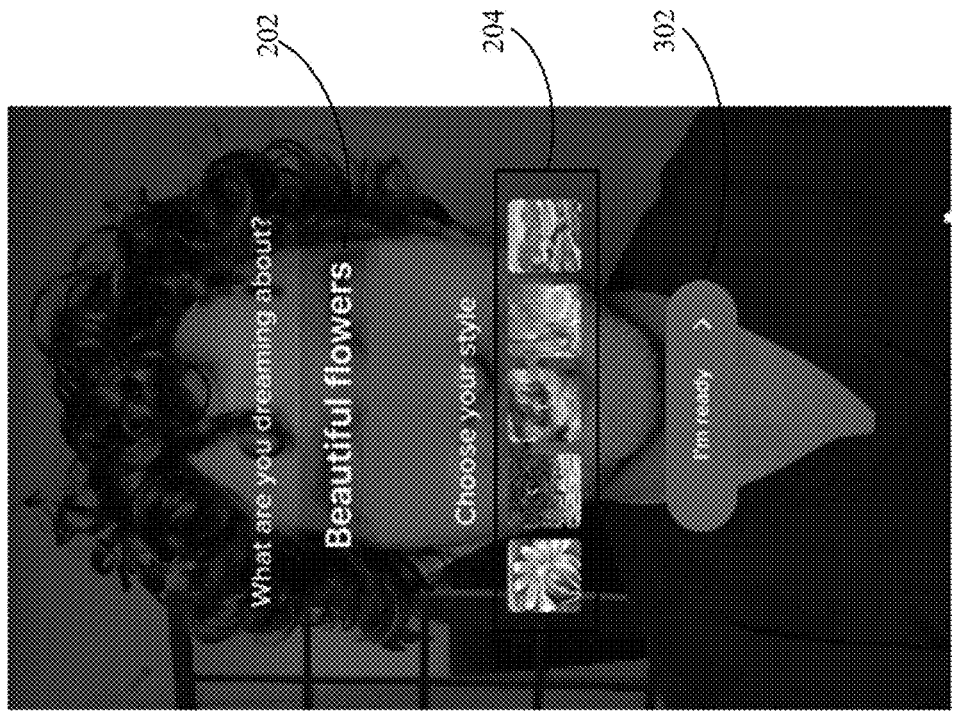
FIG. 6a shows another example user interface of a content distribution application in accordance with the present disclosure.

In certain embodiments, the user may not want to create a video with the final image(s). For example, the user may want to use a different image as the background of his or her video. If so, the user can choose a button 504 to reinitiate the image generation process described above. For example, if the user selects the button 504, the UI 200 may reappear and the user may re-enter text (the same or different text) and/or may re-select a style (the same of a different style). FIG. 6a shows an example UI 600 depicting new text entered in the text box 202 by the user. After the user has re-entered the text and/or re-selected a style, the user may once again select the button 302 to initiate generation of the one or more new images. As shown by the UI 601 of FIG. 6b, the content application 106 may be configured to generate at least one part of a real-time camera feed on top of (i.e., overlayed on, interposed on) the new image(s). For example, if the user is using a front camera of his or her client device 104, the user's real-time selfie 502 may appear over the new image(s) so that the new image(s) act as a background in the user's video. The user can record him or herself with the new image(s) in the background.

In certain embodiments, the content application 106 may lay different or additional content over the generated images. For example, the content application 106 may lay, instead of or in addition to the live camera feed, text graphics or image graphics (such as emojis) over the generated images. The content may be overlaid in various locations on the image(s). The various locations may be randomly selected and/or the locations may be selected according to an algorithm. The content may be any size, shape, or color. For example, the content may be text graphics in any size, color, or font.

Figure 7B:
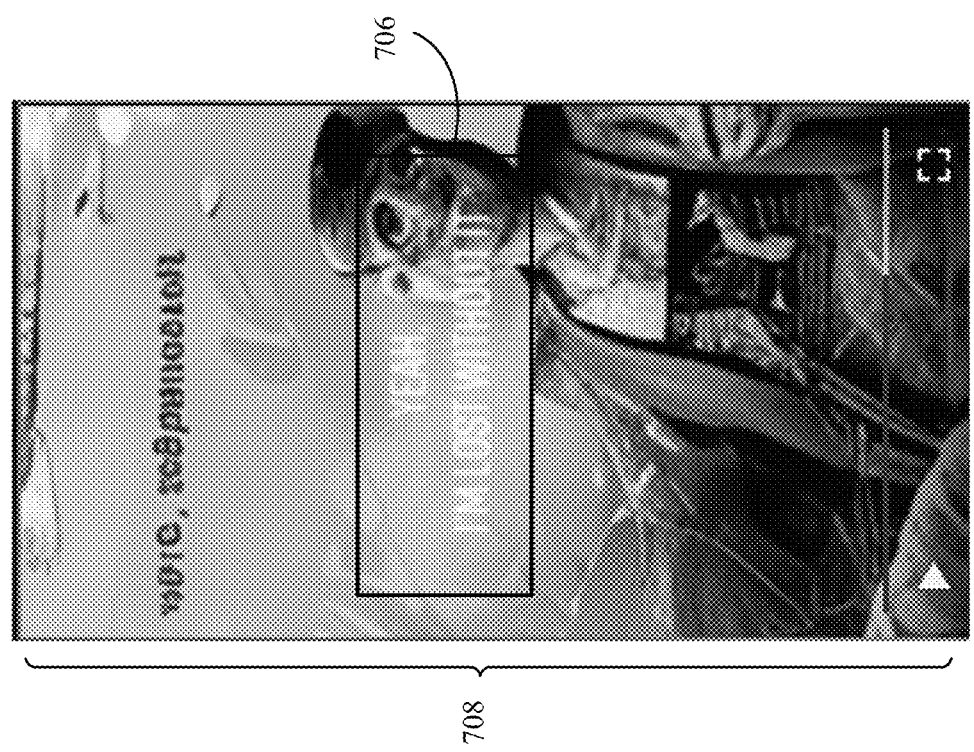
FIG. 7b shows another example user interface of a content distribution application in accordance with the present disclosure.
Figure 7A:
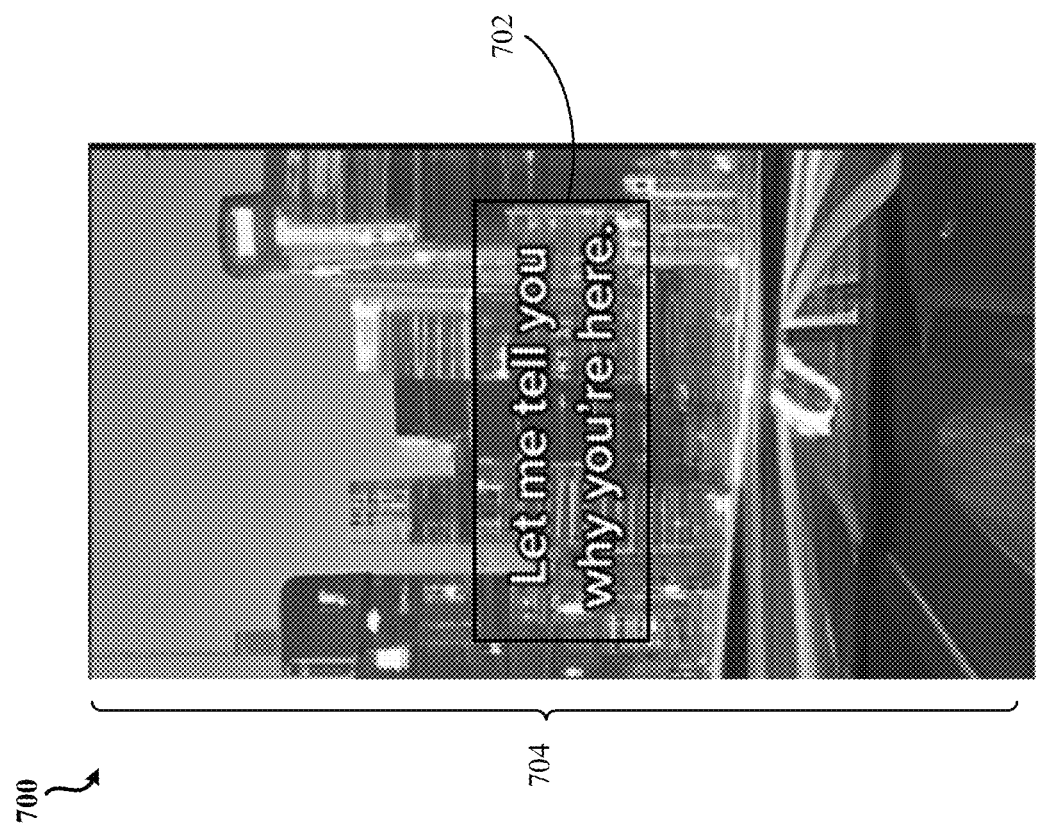
FIG. 7a shows another example user interface of a content distribution application in accordance with the present disclosure.

In certain embodiments, one or more users may want to utilize the content application 106 create a video narrating a story. Text corresponding to the story may be utilized to generate a plurality of images corresponding to the story. For example, the machine learning model(s) 110 may generate an image for each sentence or paragraph of the story. The plurality of images may, for example, be copyright-free. The plurality of images may be utilized to create a video narrating the story. Instead of a user's live camera feed appearing over the generated images, a text graphic of the text corresponding to the story may be overlayed on the corresponding image. For example, the video may comprise a plurality of frames, with each frame displaying a particular image and the corresponding text of the story. FIG. 7a shows an example UI 700 depicting a text graphic 702 depicting a sentence of a story overlayed on an image 704 generated by the machine learning model(s) 110. As described above, the image 704 may be just one image of a plurality of images generated to narrate the story.

In certain embodiments, or more users may want to utilize the content application 106 create music video for a song. Text corresponding to the song lyrics may be utilized to generate a plurality of images corresponding to the song. For example, the machine learning model(s) 110 may generate an image for each song lyric. The plurality of images may, for example, be copyright-free. The plurality of images may be utilized to create a music video for the song. Instead of a user's live camera feed appearing over the generated images, a text graphic of the song lyrics may be overlayed on the corresponding image. For example, the video may comprise a plurality of frames, with each frame displaying a particular image and the corresponding song lyric. FIG. 7b shows an example UI 701 depicting a text graphic 706 depicting a song lyric overlayed on an image 708 generated by the machine learning model(s) 110. As described above, the image 708 may be just one image of a plurality of images generated for the music video.

In certain embodiments, the machine learning model(s) 110 are configured to generate a plurality of different images from the same input text prompts. For example, more than one user of the content service 112 may input the same text prompt and the machine learning model(s) 110 may generate, for each the users, a different image related to that text prompt. Each of the plurality of different images may be randomly generated from the same input text. The machine learning model(s) 110 may be configured to ensure that each of the plurality of different images have the correct correlation to the input text.

Figure 8:
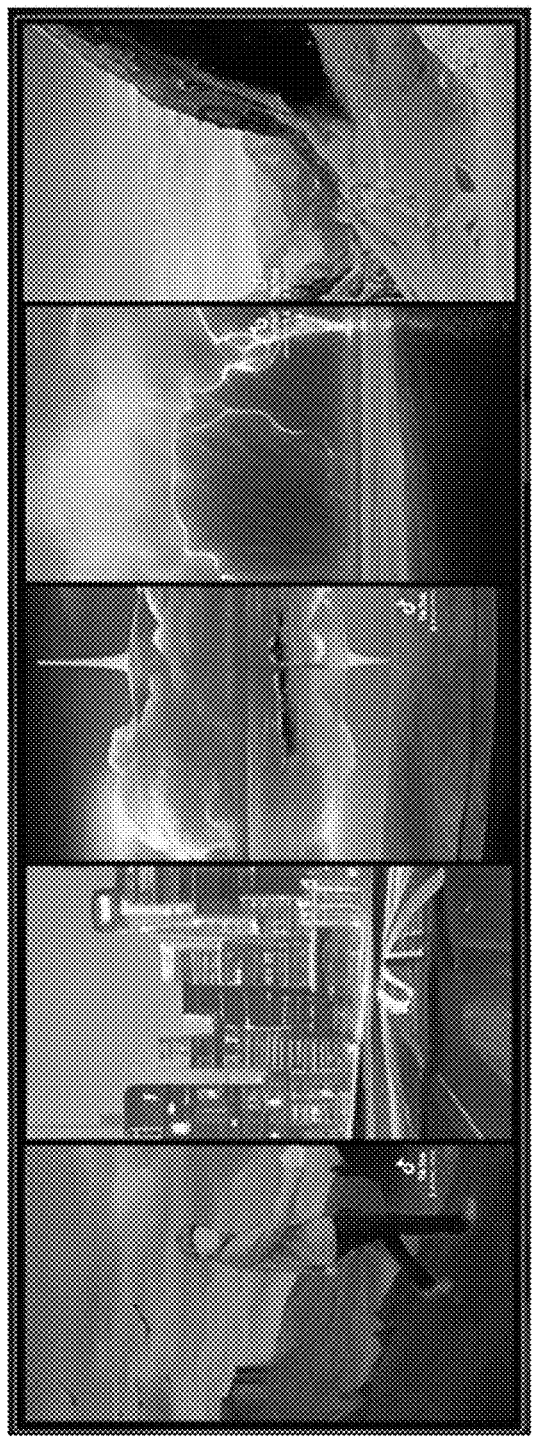
FIG. 8 shows another example user interface of a content distribution application in accordance with the present disclosure.
Figure 8:
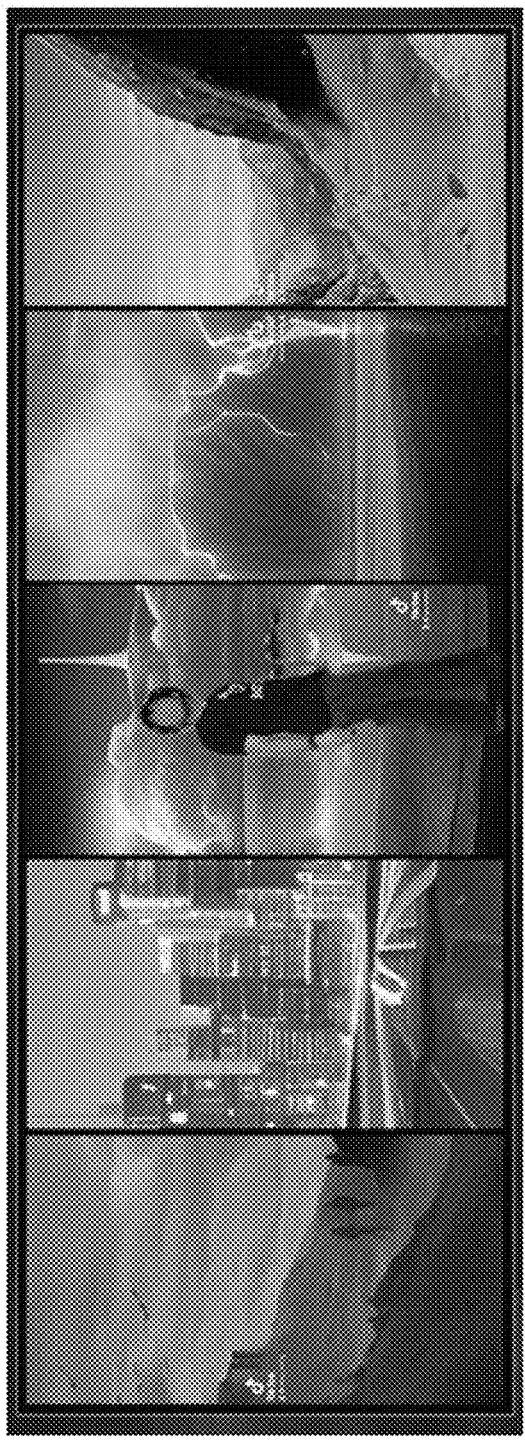

A plurality of users can use the same text (i.e., same words, phrases, or sentences) to create a shared virtual world with the plurality of different images. FIG. 8 shows an example of UI 800 depicting that a plurality of users create videos and share a virtual world using different images generated based on the same text input by the plurality of users. Each of the plurality of users can visit, play, or interact in the virtual world. For example, each of the plurality of users can take creative pictures or shoot creative videos with the plurality of generated images as the background.

Figure 9:
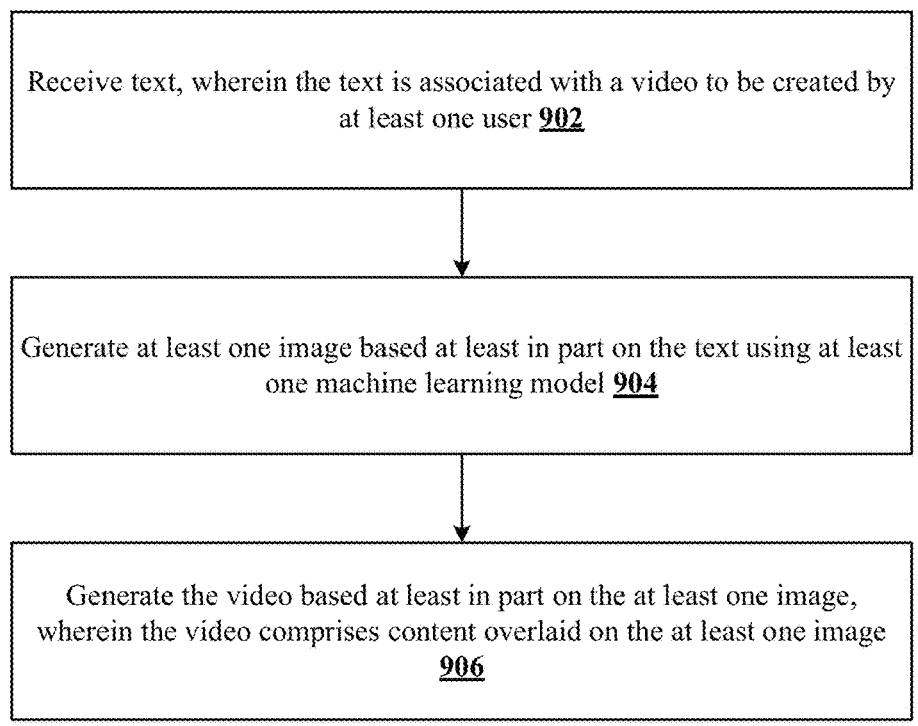
FIG. 9 shows an example method for creating content, which may be performed by a user device in accordance with the present disclosure.

FIG. 9 illustrates an example process 900 performed by the client device (e.g., client device 104). The client device 104 may perform the process 900 to create content, such as content for uploading to a content service (i.e., content service 112). Once uploaded to the content service, the content may be viewed by users of the content service. Although depicted as a sequence of operations in FIG. 9, those of ordinary skill in the art will appreciate that various embodiments may add, remove, reorder, or modify the depicted operations.

As described above, one or more machine learning model(s) (i.e., machine learning model(s) 110) may be utilized to generate at least one image based at least in part on text. At 902, text may be received. The text may be associated with a video to be created by at least one user, such as one or more users of a content service. For example, if the at least one user wants to create a video with a floral background, the text may include the word "flowers," "floral" "garden," etc. The text, for example, may be input by the at least one user that wants to create a video. For example, the text may be input by at least one user into an interface of a content application. The text may be input such as by using a keyboard of a client device or via voice command. Additionally, or alternatively, the text may comprise one or more song lyrics. The song lyrics may be manually input by at least one user (such as into an interface of the content application) and/or the song may be a song that is pre-stored in a sound library of the content application. If the song is a song that is already stored in a sound library of the content application, the lyrics (i.e., text) associated with the song may already be known.

At 904, at least one image may be generated based at least in part on the text using at least one machine learning model. For example, a first machine learning model may be configured to generate at least one initial image based at least in part on the text. The at least one initial image may comprise, for example, at least one 256×256 image. The content of at least one initial image may match the meaning of the text. A second machine learning model may be configured to generate training data to train the first machine learning model. For example, the second machine learning model may be configured to receive a plurality of images and generate a plurality of text captions corresponding to the plurality of images. The second machine learning model may generate such text captions for hundreds, thousands, or millions of images. The first machine learning model may be trained on a dataset comprising the plurality of images and the plurality of corresponding text captions. In this manner, it can be ensured that the first machine learning model is trained on accurate image-text pairs.

A third machine learning model may be configured to improve the resolution of the initial image(s) output by the first machine learning model. The third machine learning model may be a super-resolution model. For example, the third machine learning model may receive both the complete text and the at least one initial image. The third machine learning model may be configured to generate, based on the complete text and the at least one initial image, at least one final image. The at least one final image has a higher resolution than the at least one initial image. For example, the at least one final image may be a 1024×1024 image (as opposed to the at least one 256×256 initial image). The at least one final image may be output to the at least one user, such as via an interface of the content application.

At 906, the video may be generated based at least in part on the at least one image. At least one frame of the video may comprise content overlaid on the at least one image. For example, the content may comprise at least one part of a real-time camera feed. The at least one part of a real-time camera feed may be overlayed on top of the generated image(s). For example, if the user is using a front camera of his or her client device, the user's real-time selfie may appear over the generated image(s) so that the generated image(s) act as a background in the user's video. The user can record him or herself with the generated image(s) in the background. Additionally, or alternatively, the content may comprise text graphics or image graphics (such as emojis) over the generated images. For example, as described above, the content may comprise text graphics of song lyrics and/or stories. The content may be overlaid in various locations on the image(s). The various locations may be randomly selected and/or the locations may be selected according to an algorithm. The content may be any size, shape, or color. For example, the content may be text graphics in any size, color, or font.

Figure 10:
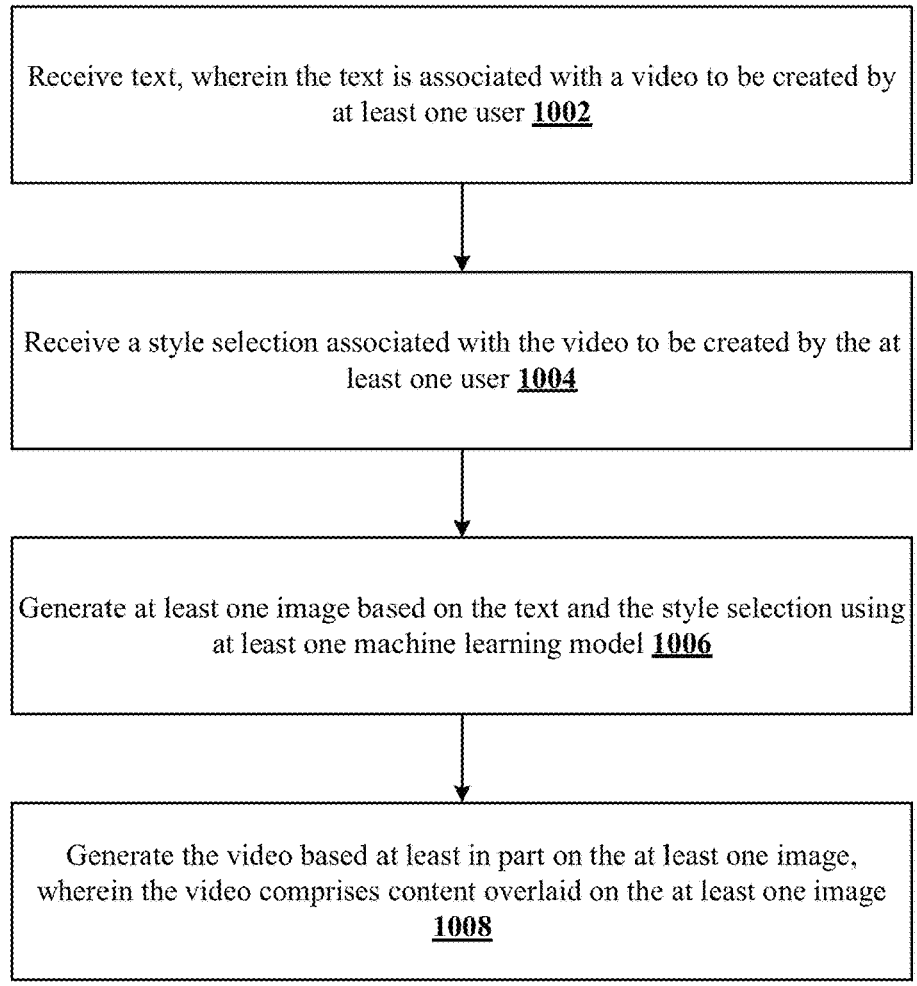
FIG. 10 shows another example method for creating content, which may be performed by a user device in accordance with the present disclosure.

FIG. 10 illustrates an example process 1000 performed by the client device (e.g., client device 104). The client device 104 may perform the process 1000 to create content, such as content for uploading to a content service (i.e., content service 112). Once uploaded to the content service, the content may be viewed by users of the content service. Although depicted as a sequence of operations in FIG. 10, those of ordinary skill in the art will appreciate that various embodiments may add, remove, reorder, or modify the depicted operations.

As described above, one or more machine learning model(s) (i.e., machine learning model(s) 110) may be utilized to generate at least one image based on text and a style selection. At 1002, text may be received. The text may be associated with a video to be created by at least one user, such as one or more users of a content service. For example, if the at least one user wants to create a video with a floral background, the text may include the word "flowers," "floral" "garden," etc. The text, for example, may be input by the at least one user that wants to create a video. For example, the text may be input by at least one user into an interface of a content application. The text may be input such as by using a keyboard of a client device or via voice command. Additionally, or alternatively, the text may comprise one or more song lyrics. The song lyrics may be manually input by at least one user (such as into an interface of the content application) and/or the song may be a song that is pre-stored in a sound library of the content application. If the song is a song that is already stored in a sound library of the content application, the lyrics (i.e., text) associated with the song may already be known.

At 1004, a style selection associated with the video to be created by the at least one user may be received. The style selection may indicate at least one of a color, a texture, or an artistic style associated with the video to be created by at least one user of the content service. For example, if at least one user wants to create a video with a black and white background, the style selection may indicate a black and white color scheme. The style selection for example, may be input by the at least one user that wants to create a video. For example, the style selection may be input by at least one user into an interface of a content application. The style selection may be input such as by selecting an icon corresponding to the desired style on an interface of the content application, using a keyboard of a client device, and/or via voice command.

At 1006, at least one image may be generated based on the text and the style selection using at least one machine learning model. The style selection may be converted to additional text before the at least one machine learning model generates the at least one image. For example, the selected style may be converted to additional text, and this additional text may be appended to the text to create a complete set of text.

The complete set of text (i.e., the text and the additional text) may be forwarded or sent to a first machine learning model. The first machine learning model may be configured to generate at least one initial image based at least in part on the complete set of text. The at least one initial image may comprise, for example, at least one 256×256 image. The content of at least one initial image may match the meaning of the complete set of text. A second machine learning model may be configured to generate training data to train the first machine learning model. For example, the second machine learning model may be configured to receive a plurality of images and generate a plurality of text captions corresponding to the plurality of images. The second machine learning model may generate such text captions for hundreds, thousands, or millions of images. The first machine learning model may be trained on a dataset comprising the plurality of images and the plurality of corresponding text captions. In this manner, it can be ensured that the first machine learning model is trained on accurate image-text pairs.

A third machine learning model may be configured to improve the resolution of the initial image(s) output by the first machine learning model. The third machine learning model may be a super-resolution model. For example, the third machine learning model may receive both the complete text and the at least one initial image. The third machine learning model may be configured to generate, based on the complete text and the at least one initial image, at least one final image. The at least one final image has a higher resolution than the at least one initial image. For example, the at least one final image may be a 1024×1024 image (as opposed to the at least one 256×256 initial image). The at least one final image may be output to the at least one user, such as via an interface of the content application.

At 1008, the video may be generated based at least in part on the at least one image. At least one frame of the video may comprise content overlaid on the at least one image. For example, the content may comprise at least one part of a real-time camera feed. The at least one part of a real-time camera feed may be overlayed on top of the generated image(s). For example, if the user is using a front camera of his or her client device, the user's real-time selfie may appear over the generated image(s) so that the generated image(s) act as a background in the user's video. The user can record him or herself with the generated image(s) in the background. Additionally, or alternatively, the content may comprise text graphics or image graphics (such as emojis) over the generated images. For example, as described above, the content may comprise text graphics of song lyrics and/or stories. The content may be overlaid in various locations on the image(s). The various locations may be randomly selected and/or the locations may be selected according to an algorithm. The content may be any size, shape, or color. For example, the content may be text graphics in any size, color, or font.

Figure 11:
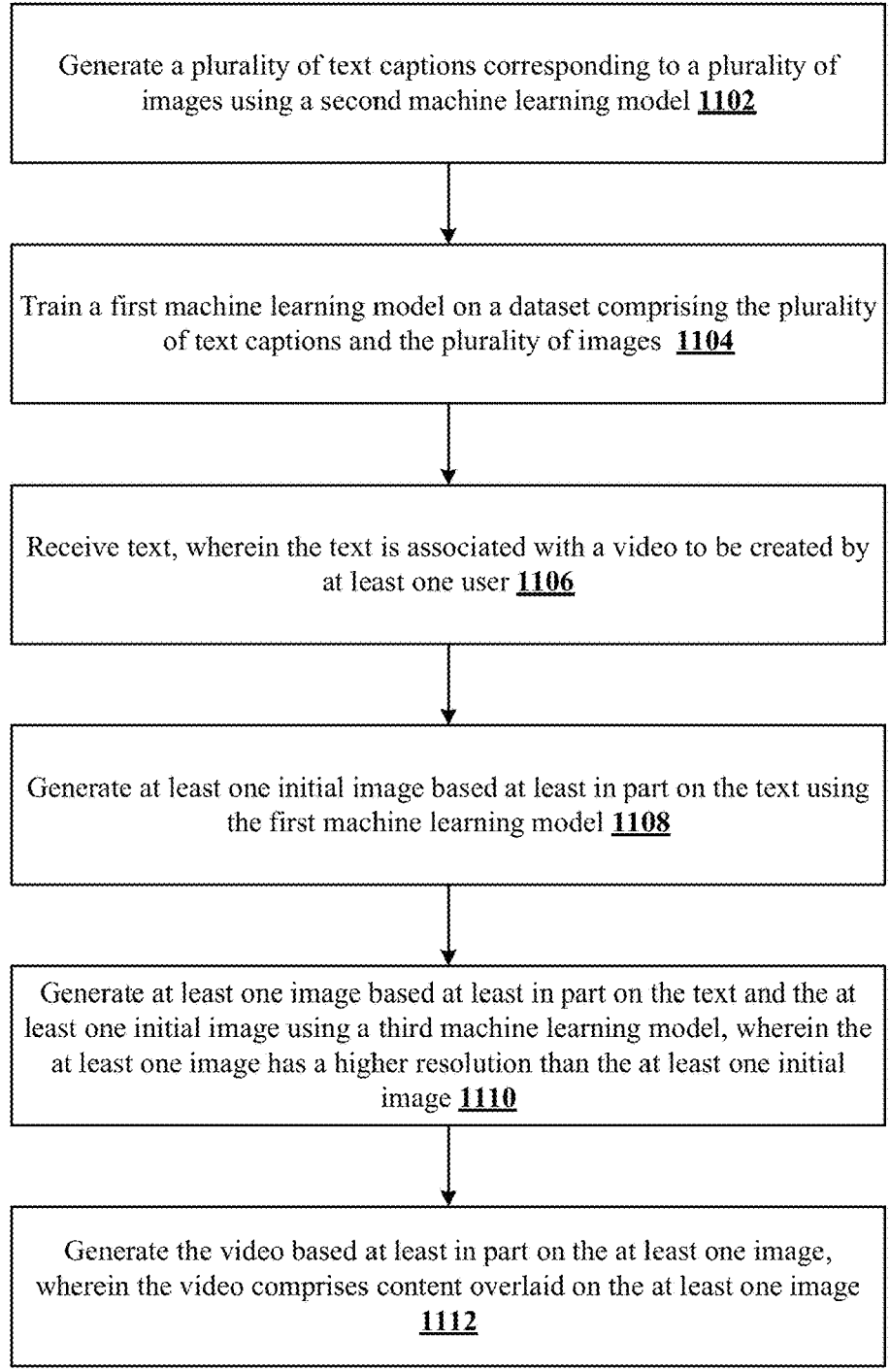
FIG. 11 shows another example method for creating content, which may be performed by a user device in accordance with the present disclosure.

FIG. 11 illustrates an example process 1100 performed by the client device (e.g., client device 104). The client device 104 may perform the process 1100 to create content, such as content for uploading to a content service (i.e., content service 112). Once uploaded to the content service, the content may be viewed by users of the content service. Although depicted as a sequence of operations in FIG. 11, those of ordinary skill in the art will appreciate that various embodiments may add, remove, reorder, or modify the depicted operations.

As described above, one or more machine learning model(s) (i.e., machine learning model(s) 110) may be utilized to generate at least one image based at least in part on text. At 1102, a plurality of text captions corresponding to a plurality of images may be generated using a second machine learning model. The second machine learning model may be configured to receive a plurality of images and generate a plurality of text captions corresponding to the plurality of images. For example, the second machine learning model may be configured to receive an image of a white dog and generate a text caption corresponding to that image that indicates the image depicts a white dog. The second machine learning model may generate such text captions for hundreds, thousands, or millions of images.

A first machine learning model may be trained on a dataset comprising the plurality of images and the plurality of corresponding text captions. At 1104, a first machine learning model may be trained on a dataset comprising the plurality of corresponding text captions and the plurality of images. By training the first machine learning model on the image-text pairs generated by the second machine learning model, it can be ensured that the first machine learning model is trained on accurate image-text pairs. By contrast, if the first machine learning model were to instead be trained on available open-source datasets, the first machine learning model may not perform as well due to the inaccuracies often found in these available open-source datasets.

At 1106, text may be received. The text may be associated with a video to be created by at least one user, such as one or more users of a content service. For example, if the at least one user wants to create a video with a floral background, the text may include the word "flowers," "floral" "garden," etc. The text, for example, may be input by the at least one user that wants to create a video. For example, the text may be input by at least one user into an interface of a content application. The text may be input such as by using a keyboard of a client device or via voice command. Additionally, or alternatively, the text may comprise one or more song lyrics. The song lyrics may be manually input by at least one user (such as into an interface of the content application) and/or the song may be a song that is pre-stored in a sound library of the content application. If the song is a song that is already stored in a sound library of the content application, the lyrics (i.e., text) associated with the song may already be known.

At 1108, at least one initial image may be generated based at least in part on the text using the first machine learning model. The at least one initial image may comprise, for example, at least one 256×256 image. The content of at least one initial image may match the meaning of the text.

A third machine learning model may be configured to improve the resolution of the initial image(s) output by the first vamachine learning model. The third machine learning model may be a super-resolution model. For example, the third machine learning model may receive both the text and the at least one initial image. The third machine learning model may be configured to generate, based on the text and the at least one initial image, the at least one image. At 1110, at least one image may be generated based at least in part on the text and the at least one initial image using the third machine learning model. The at least one image generated by the third machine learning model closely relates to the text and has a higher resolution than the at least one initial image. For example, the at least one image may be a 1024×1024 image (as opposed to the at least one 256×256 initial image). The at least one image may be output to the at least one user, such as via an interface of the content application.

At 1112, the video may be generated based at least in part on the at least one image. At least one frame of the video may comprise content overlaid on the at least one image. For example, the content may comprise at least one part of a real-time camera feed. The at least one part of a real-time camera feed may be overlayed on top of the generated image(s). For example, if the user is using a front camera of his or her client device, the user's real-time selfie may appear over the generated image(s) so that the generated image(s) act as a background in the user's video. The user can record him or herself with the generated image(s) in the background. Additionally, or alternatively, the content may comprise text graphics or image graphics (such as emojis) over the generated images. For example, as described above, the content may comprise text graphics of song lyrics and/or stories. The content may be overlaid in various locations on the image(s). The various locations may be randomly selected and/or the locations may be selected according to an algorithm. The content may be any size, shape, or color. For example, the content may be text graphics in any size, color, or font.

Figure 12:
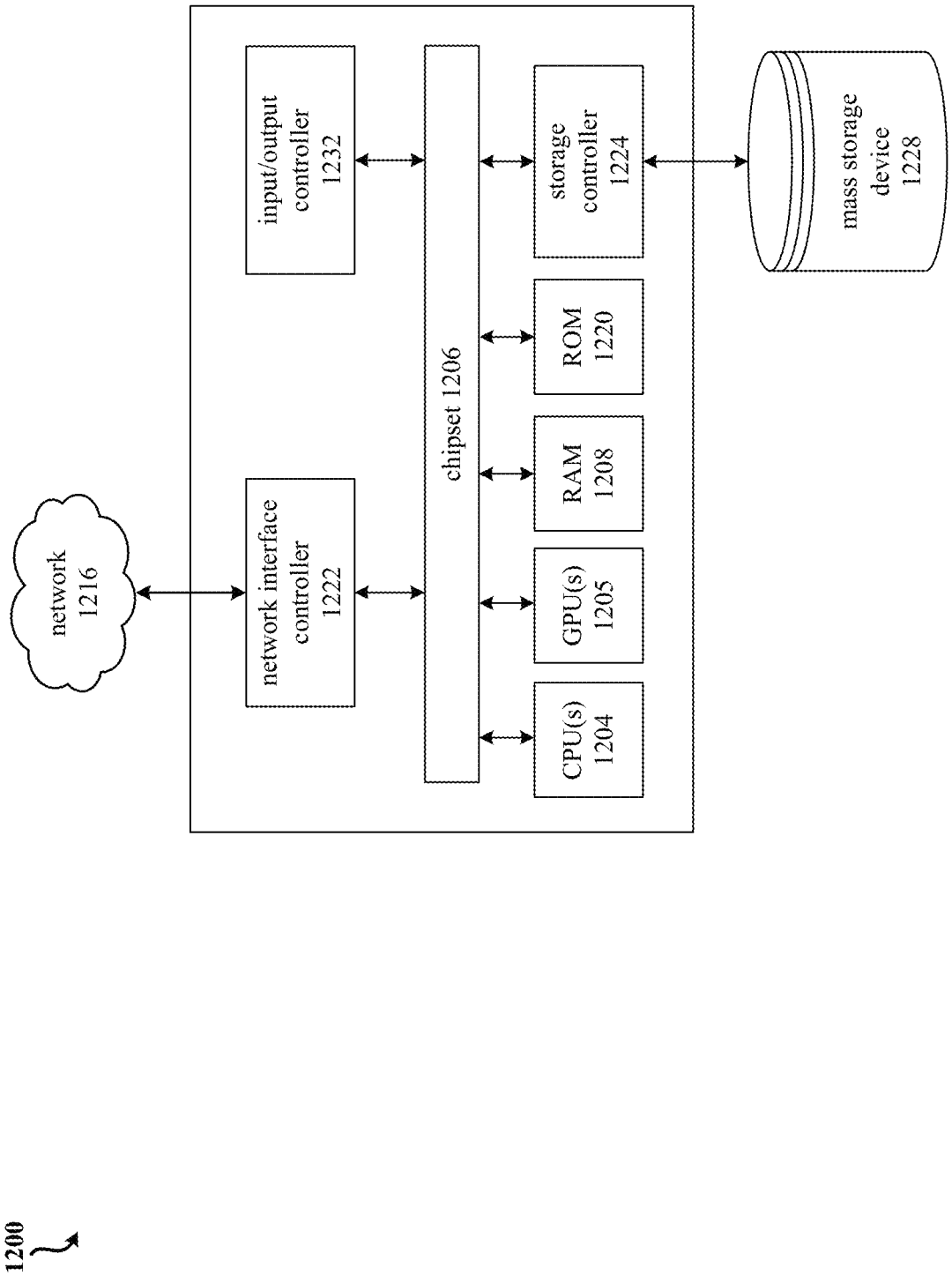
FIG. 12 shows an example computing device which may be used to perform any of the techniques disclosed herein.

FIG. 12 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s). The GPU(s) may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating visual effects based on text, comprising:
   initiating a process of generating a visual effect based on text input by at least one user in response to a selection of an interface element;
   generating the visual effect, wherein the generating the visual effect comprises generating a first image based on a first text input by a first user;
   displaying the first image on a screen of a computing device, wherein content of the first image correlates with the first text;
   wherein the method further comprises:
   receiving a third text input by a second user, wherein the third text is the same as the first text that is input by the first user and based on which the first image is generated, and wherein the second user is different from the first user; and
   generating a third image based on the third text input by the second user, wherein the third image generated based on the third text is different from the first image generated based on the first text.

2. The method of claim 1, further comprising:
generating a video by using the first image as a background.

3. The method of claim 1, further comprising:
receiving a second text input by the first user; and
generating a second image based on the second text, wherein content of the second image correlates with the second text.

4. The method of claim 3, further comprising:
generating a video based on the first image and the second image, wherein the video narrates a story indicated by the first text and the second text.

5. The method of claim 1, further comprising:
generating a video based on the first image and the third image.

6. The method of claim 1, wherein the first image is generated by a machine learning model, and wherein the machine learning model is pre-trained to generate images based on text.

7. A computing device, comprising:
at least one processor; and
at least one memory communicatively coupled to the at least one processor and comprising computer-readable instructions that upon execution by the at least one processor cause the at least one processor to perform operations comprising:
initiating a process of generating a visual effect based on text input by at least one user in response to a selection of an interface element;
generating the visual effect, wherein the generating the visual effect comprises generating a first image based on a first text input by a first user;
displaying the first image on a screen of a computing device, wherein content of the first image correlates with the first text;
wherein the operations further comprise:
receiving a third text input by a second user, wherein the third text is the same as the first text that is input by the first user and based on which the first image is generated, and wherein the second user is different from the first user; and
generating a third image based on the third text input by the second user, wherein the third image generated based on the third text is different from the first image generated based on the first text.

8. The computing device of claim 7, the operations further comprising:
generating a video by using the first image as a background.

9. The computing device of claim 7, the operations further comprising:
receiving a second text input by the first user; and
generating a second image based on the second text, wherein content of the second image correlates with the second text.

10. The computing device of claim 9, the operations further comprising:
generating a video based on the first image and the second image, wherein the video narrates a story indicated by the first text and the second text.

11. The computing device of claim 7, the operations further comprising:
generating a video based on the first image and the third image.

12. The computing device of claim 7, wherein the first image is generated by a machine learning model, and wherein the machine learning model is pre-trained to generate images based on text.

13. A non-transitory computer-readable storage medium, storing computer-readable instructions that upon execution by a processor cause the processor to implement operations comprising:
initiating a process of generating a visual effect based on text input by at least one user in response to a selection of an interface element;
generating the visual effect, wherein the generating the visual effect comprises generating a first image based on a first text input by a first user;
displaying the first image on a screen of a computing device, wherein content of the first image correlates with the first text;
wherein the operations further comprise:
receiving a third text input by a second user, wherein the third text is the same as the first text that is input by the first user and based on which the first image is generated, and wherein the second user is different from the first user; and
generating a third image based on the third text input by the second user, wherein the third image generated based on the third text is different from the first image generated based on the first text.

14. The non-transitory computer-readable storage medium of claim 13, the operations further comprising:
generating a video by using the first image as a background.

15. The non-transitory computer-readable storage medium of claim 13, the operations further comprising:
receiving a second text input by the first user; and
generating a second image based on the second text, wherein content of the second image correlates with the second text.

16. The non-transitory computer-readable storage medium of claim 15, the operations further comprising:
generating a video based on the first image and the second image, wherein the video narrates a story indicated by the first text and the second text.

17. The non-transitory computer-readable storage medium of claim 13, the operations further comprising:
generating a video based on the first image and the third image.

* * * * *